Patented Oct. 16, 1934

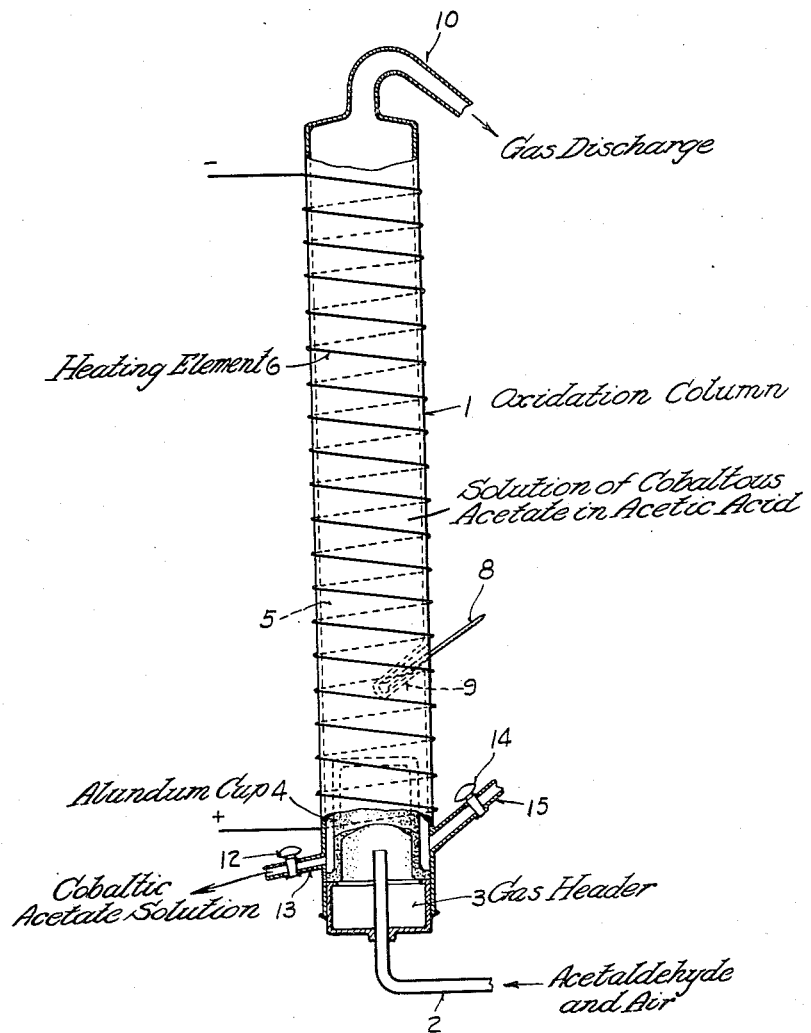

1,976,757

UNITED STATES PATENT OFFICE 1,976,757

MANUFACTURE OF COBALTIC ACETATE

Walter O. Walker and Ulrich Kopsch, Milwaukee, Wis., assignors to A. O. Smith Corporation, Milwaukee, Wis., a corporation of New York Application May 7, 1932, Serial No. 609,817

14 Claims. (Cl. 260—11)

The invention relates to the manufacture of cobaltic compounds by the oxidation of the cobaltous compounds, and especially to processes in which oxygen, air or an oxygen containing gas is used directly as the oxidizing agent.

It is among the objects of the invention to provide cobaltic compounds which are free from material amounts of non-cobaltic or insoluble compounds. Another object of the invention is to provide for manufacturing these compounds as concentrated solutions or as solids without applying costly methods of purification or preparation.

In accordance with the invention, a solution of cobaltous acetate in acetic acid is contacted with oxygen in the presence of acetaldehyde. By passing the mixture of gas, as by bubbling, through the solution the cobaltous acetate therein is oxidized to cobaltic acetate and some acetic acid is formed. The cobaltous acetate is soluble to the extent of only a few parts in acetic acid whereas cobaltic acetate is extremely soluble. By adding to the solution cobaltous acetate or compounds of cobalt which are soluble in the solution and form the acetate, such as cobalt carbonate, the concentration of cobalt in the solution is increased and gradually a higher concentration of cobaltic acetate is formed. The concentration of the cobaltic compound may be increased to any desired concentration up to its limit of solubility. The solvent may then be removed.

The invention will be described with reference to the drawing in which the sole figure is a diagrammatic view of an oxidizing column.

As illustrative of one method of practicing the invention, a saturated solution of cobaltous acetate in glacial acetic acid was made by adding cobaltous acetate which contains 4 molecules of water of crystallization to glacial acetic acid which contained about 1% water. The oxidation column 1 was filled nearly full of this solution and the solution was heated to 50° to 85° C. A mixed gas containing 15% to 20% acetaldehyde and the remainder air was pumped through the pipe 2, into the header 3 at the bottom of the column and through an inverted porous alundum cup 4 or similar device for distributing the gas in the solution. The alundum cup was sealed into the lower end of the reaction chamber 5. The alundum cup constituted a porous partition between the gas header and the reaction chamber and provided a means of obtaining a large contact surface of gas and liquid. The mixed gas mingled and contacted with the solution as extremely small bubbles and oxidized the cobaltous acetate to cobaltic acetate. As soon as a substantial amount of cobaltic acetate was formed, acetic acid was also formed.

The temperature of the solution in the tower was maintained at about 50° to 85° C. by passing current through the resistance heating element 6, which was wound around the reaction chamber, until the oxidation reaction started; heat of reaction maintains the temperature thereafter. A thermometer 8 was used in the thermometer well 9 to indicate the temperature of the solution. The gases which were discharged from the top of the tower were conducted through a discharge pipe 10 into a condenser and the condensable gases therein, such as acetaldehyde and acetic acid were recovered to avoid loss thereof.

As the cobaltous acetate became oxidized to cobaltic acetate the color of the solution became dark green to black. Additional cobaltous acetate may be dissolved in the reaction medium and the percent of cobaltic acetate thus gradually built up. The solution was removed by opening the valve 12 in the discharge pipe 13 at the bottom.

The cobaltic acetate solution contained acetic acid, water and some unoxidized cobaltous acetate. The cobaltic acetate was purified by evaporation in vacuo over phosphoric anhydride at about 25° C. The product contained about 95% cobaltic acetate, about 4% of cobaltous acetate and the remainder water and impurities.

From fractional percentages, such as 0.1% to saturated solutions of cobaltous acetate in acetic acid, such as about 4.0% may be used. Excessive amounts of water hydrolyze the cobaltic acetate. Glacial acetic acid which may be anhydrous or may contain up to about 10% water is desirable but up to about 15% water may be present if the product is rapidly dehydrated. The evaporation is desirably carried out at temperatures below about 45° C.

It is to be understood that the cobaltous acetate may be present in the reaction solution in excess of that which is soluble or it may be formed in the solution by adding a cobalt compound which is soluble in or reacts with acetic acid to form cobaltous acetate. Various compounds, such as cobalt carbonate and oxide which reaction with acetic acid to form cobaltous acetate may be used.

The oxidizing gas may be composed of oxygen or it may consist of oxygen and an inert gas such as nitrogen, hydrogen, hydrocarbon gases and the like. Air is an excellent oxidizing gas.

It is not necessary to add the acetaldehyde to the reaction medium as a gas. It may be added as a liquid either by opening the valve 14 and injecting it into the reaction medium through the connection 15 in the lower part of the column or through the pipe 2. It is to be understood that various other modifications can be made without departing from the invention and that no limitations are intended except those expressed in the claims or imposed by prior art.

We claim:

1. The method of manufacturing cobaltic acetate which comprises contacting oxygen and acetaldehyde with a solution of cobaltous acetate in acetic acid at temperatures of about 50° to about 85° C., and removing the solvent.

2. The method of manufacturing cobaltic acetate which comprises contacting oxygen and acetaldehyde with a solution of cobaltous acetate in glacial acetic acid at temperatures of about 50° to about 85° C., and removing the solvent.

3. The method of manufacturing cobaltic acetate which comprises contacting oxygen and acetaldehyde with a saturated solution of cobaltous acetate in acetic acid at temperatures of about 50° to about 85° C., and removing the solvent.

4. The method of manufacturing cobaltic acetate which comprises mingling a gas mixture comprising oxygen and acetaldehyde with a solution of cobaltous acetate in glacial acetic acid to oxidize cobaltous to cobaltic acetate, and maintaining the temperature of reaction at about 50° to about 85° C.

5. The method of manufacturing cobaltic acetate which comprises passing a gas which comprises oxygen in contact with acetalydehyde and an acetic acid solution of cobaltous acetate, and maintaining the reaction temperature at about 50° to about 85 C.

6. The method of manufacturing cobaltic acetate which comprises bubbling a gas mixture containing about 15% to 20% acetaldehyde and the remainder air into an acetic acid solution of cobaltous acetate to oxidize cobaltous to cobaltic acetate, maintaining reaction temperatures of about 65° C., and evaporating the solvent at temperatures which do not exceed 45° C.

7. The method of manufacturing cobaltic acetate which comprises contacting oxygen and acetaldehyde with a solution of cobaltous acetate in acetic acid at temperatures of about 50° to about 85° C. to oxidize cobaltous to cobaltic acetate, and adding cobaltous acetate as the cobaltic acetate is formed to increase the concentration of cobaltic acetate in the solution.

8. The method of manufacturing cobaltic acetate which comprises contacting oxygen and acetaldehyde with a solution of cobaltous acetate in acetic acid at temperatures of about 50° to about 85° C. to oxidize cobaltous to cobaltic acetate, adding a soluble cobalt salt of an acid weaker than acetic acid as the cobaltic acetate is formed to increase the concentration of cobaltic acetate in the solution, and removing the solvent.

9. The method of manufacturing cobaltic acetate which comprises contacting oxygen and acetaldehyde with a solution of cobaltous acetate in acetic acid at temperatures of about 50° to about 85° C. to oxidize cobaltous to cobaltic acetate, and replenishing the solution with cobaltous acetate as the cobaltic acetate is formed by adding a cobalt compound which is soluble therein and forms cobaltous acetate in solution.

10. The method of manufacturing cobaltic acetate which comprises contacting oxygen and acetaldehyde with a solution of cobaltous acetate in acetic acid at temperatures of about 50° to about 85° C. to oxidize cobaltous to cobaltic acetate, and increasing the concentration of the cobalt as the cobaltic acetate is formed by adding to the solution a compound of cobalt which is soluble therein and forms cobaltous acetate solution therewith.

11. The method of manufacturing cobaltic acetate which comprises contacting oxygen and acetaldehyde with a solution of cobaltous acetate in acetic acid at temperatures of about 50° to about 85° C. to oxidize cobaltous to cobaltic acetate, increasing the concentration of the cobalt as the cobaltic acetate is formed by adding to the solution a compound of cobalt which is soluble therein and forms cobaltous acetate solution therewith, and concentrating by removing solvent.

12. The method of manufacturing cobaltic acetate which comprises contacting oxygen and acetaldehyde with a solution of cobaltous acetate in acetic acid at temperatures of about 50° to about 85° C., and increasing the concentration of cobalt in solution as cobaltic acetate is formed by adding at least one of the compounds from the group consisting of cobaltous acetate, cobalt carbonate and cobalt oxide.

13. The method of manufacturing cobaltic acetate which comprises passing a gas which contains oxygen in contact with acetaldehyde and an acetic acid solution of a cobalt compound which is capable of forming cobaltous acetate therein, and maintaining the reaction temperature at about 50° to about 85° C.

14. The method of manufacturing cobaltic acetate which comprises passing a gas which contains oxygen in contact with acetaldehyde and an acetic acid solution of a cobalt compound which is capable of forming cobaltous acetate therein, and maintaining the solution at a temperature which will effect the oxidation of the cobaltous acetate to cobaltic acetate.

WALTER O. WALKER.
ULRICH KOPSCH.